Patented Dec. 23, 1941

2,266,993

UNITED STATES PATENT OFFICE 2,266,993

CALCIUM SALT AND METHOD OF PREPARATION

Richard O. Roblin, Jr., Stamford, Conn., assignor to American Cyanamid Company, New York, N. Y., a corporation of Maine No Drawing. Application March 23, 1940, Serial No. 325,609

4 Claims. (Cl. 260—462)

This invention relates to therapeutically useful compositions containing available calcium.

Many calcium salts have been suggested for use as therapeutic agents in the treatment of diseases caused or aggravated by a deficiency of calcium in the body, as in milk fever, skin diseases and the like. Among the salts which have been suggested for such use are calcium chloride, calcium lactate, calcium gluconate and many others of a similar nature. These materials have been, to a large extent, unsatisfactory for one or more various reasons, such as lack of stability, relatively slight solubility, or because they produce irritation or necrosis when injected.

It is one of the objects of the present invention to prepare a series of new calcium salts. It is a further object to prepare solutions of calcium salts which are therapeutically useful. It is another object to prepare stable aqueous solutions of such calcium salts of high concentration. It is a still further object to prepare stable solutions which are free from irritant and toxic properties.

These and other objects are attained by dissolving in water a sufficient quantity of a calcium salt having the following structural formula

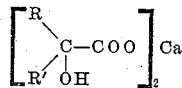

wherein R and R' represent H, $CH_3$ or $C_2H_5$ or $C_3H_7$, such solution being stabilized by the addition of boric acid which reacts to give new compounds.

The following is one specific example illustrating the present invention which, however, is not restricted to the specific details shown.

A 20% solution (by volume) may be prepared by dissolving 100 pounds of calcium alpha-hydroxyisobutyrate tetrahydrate in 500 pounds of boiling water. After the calcium salt has been dissolved but while the solution is still hot, there are added 40 pounds of boric acid, preferably with suitable agitation until solution is complete. There results a substantially neutral solution which is stable, even at low temperatures, and is suitable for use in the treatment of various animals for calcium deficiency.

The solution may be placed in sealed ampoules and sterilized in a well-known manner. If desired a preservative may be added to the solution to maintain the solution aseptic. Another method by which the solution may be sterilized is by passing the hot solution through a Berkefeld filter whereupon the filtrate is placed in suitable sterile containers and is sealed under sterile conditions.

In the specific example about 8% of boric acid by weight is used. This corresponds to about two mols of boric acid for one mol calcium alpha-hydroxyisobutyrate tetrahydrate. When used in these proportions, these substances react to give a new chemical compound which appears most probably to have the chemical structure

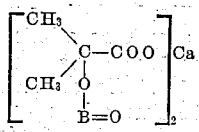

or

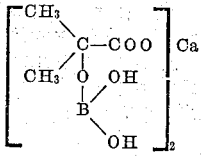

If other acids than alpha-hydroxyisobutyric acid are used, a chemical formula for this group of compounds may be written as follows:

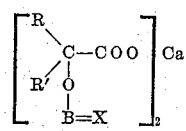

wherein R and R' represent H, $CH_3$ or $C_2H_5$ or $C_3H_7$ and X represents O or $(OH)_2$.

The structural formulas given appear to represent the reaction products obtained although the exceedingly high degree of water solubility of these compounds renders a more exact determination of chemical structure extremely difficult. However, it is not intended that the invention be limited to the formulas stated.

The boric acid reacted materials are especially valuable as therapeutic substances since there may be prepared stable solutions containing 30%, 40% or even 50% of the combined salt, prepared in accordance with the molecular ratios and procedure described in the example or in any other suitable manner.

When smaller amounts of boric acid are used than corresponds with that described in the specific example, the degree of reaction and stabilization is correspondingly decreased but these less concentrated solutions are satisfactory for some purposes.

In place of the calcium alpha-hydroxyisobutyrate I may use the calcium salts of such acids as α-hydroxy-n-butyric acid, α-hydroxy- α-methyl-n-butyric acid, α-hydroxy-α-ethyl-n-butyric acid or α-hydroxy-α-methyl-n-valeric acid and the like.

The strength of the solutions prepared may vary over a wide range although it is generally desirable to prepare a solution which is as concentrated as possible and which is still stable under the various conditions of storage and use. Calcium alpha-hydroxyisobutyrate, for instance, is normally soluble in water to the extent of 10% to make a saturated solution but, by use of the combined salts as described above, it is possible to prepare much more concentrated solutions. Thus I may prepare solutions which may contain as high as 40% of the combined calcium salts and these solutions may be maintained for long periods of time. Since the calcium salts which I use contain a high percentage of calcium, I can prepare compositions of similar concentration but of higher available calcium content than is the case with the prior art materials.

My compositions have been tried out extensively on various types of animals and have been found outstandingly effective for correcting calcium deficiency while, at the same time, being free from toxic and irritating effects.

In addition to the calcium salts described I may also include other substances having therapeutic value in the compositions. Thus I may add to the stabilized solutions various other soluble compounds such as alkaloids, various salts of the alkali and alkaline earth metal group, metallic salts, dyestuffs or other organic compounds useful in chemotherapy, glucocides, local anaesthetics and the like. It is only necessary that the additional compounds which are utilized be sufficiently soluble to permit their use in the compositions described and further, that they be sufficiently stable to permit their incorporation into my compositions.

It will be obvious that suitable changes and variations may be made in my invention without departing from the spirit and scope thereof except as defined in the appended claims.

I claim:

1. An aqueous solution of a calcium salt having the following structural formula

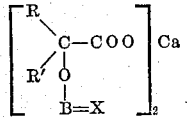

wherein R and R' each represents a member of the group consisting of H, $CH_3$, $C_2H_5$ and $C_3H_7$ and X represents a member of the group consisting of O and $(OH)_2$.

2. An aqueous solution of a calcium salt having the following structural formula

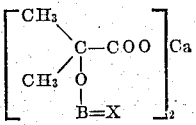

wherein X represents a member of the group consisting of O and $(OH)_2$.

3. Process which comprises reacting boric acid in aqueous solution with a calcium salt having the following structural formula

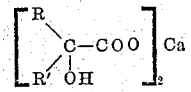

wherein R and R' each represents a member of the group consisting of H, $CH_3$, $C_2H_5$ and $C_3H_7$.

4. Process which comprises reacting boric acid in aqueous solution with calcium alpha-hydroxyisobutyrate.

RICHARD O. ROBLIN, Jr.